United States Patent [19]
Fuke et al.

[11] Patent Number: 4,701,925
[45] Date of Patent: Oct. 20, 1987

[54] ELECTRIC CONTROL SYSTEM FOR A METAL ION LASER

[75] Inventors: Akira Fuke; Yasuhiro Tokita; Katsuhiko Masuda, all of Shizuoka, Japan

[73] Assignee: Koito Seisakusho Co., Ltd., Tokyo, Japan

[21] Appl. No.: 888,452

[22] Filed: Jul. 21, 1986

[30] Foreign Application Priority Data

Jul. 22, 1985 [JP] Japan .................. 60-160079

[51] Int. Cl.⁴ ............................................. H01S 3/00
[52] U.S. Cl. ....................................... 372/38; 372/56; 372/34; 372/33; 372/29
[58] Field of Search ............. 372/34, 56, 38, 33, 372/29

[56] References Cited

U.S. PATENT DOCUMENTS

| | | |
|---|---|---|
| 3,868,593 | 2/1975 | Fukuda et al. |
| 4,021,845 | 5/1977 | Wang |
| 4,052,680 | 10/1977 | Wang et al. |
| 4,105,954 | 8/1978 | Wang et al. |
| 4,193,042 | 3/1980 | Wang |
| 4,224,579 | 9/1980 | Marlett et al. ............... 372/61 |
| 4,232,274 | 11/1980 | Tokudome et al. ............... 372/56 |
| 4,257,014 | 3/1981 | Hattori et al. |

FOREIGN PATENT DOCUMENTS

| | | | |
|---|---|---|---|
| 0078540 | 5/1983 | European Pat. Off. ............. 372/37 |
| 0178810 | 4/1986 | European Pat. Off. ............. 372/56 |
| 0078484 | 5/1983 | Japan .................................... 372/29 |

Primary Examiner—Leon Scott, Jr.
Attorney, Agent, or Firm—Browdy and Neimark

[57] ABSTRACT

A He-Cd ion laser of the type having a series of anodes open to the interior of a hollow cathode, a series of metal chambers containing a supply of Cd to be vaporized, and a heater for heating the metal chambers for vaporizing the Cd supply. For holding constant the Cd vapor pressure within the hollow cathode and, in consequence, the intensity of the output beam, an electric control system is provided which comprises a constant current regulator connected to each anode for supplying a constant current thereto, and a heater control circuit for controlling the magnitude of a current fed to the metal chamber heater so as to hold the output voltage of each constant current regulator equal to a reference voltage.

5 Claims, 3 Drawing Figures

4,701,925

ELECTRIC CONTROL SYSTEM FOR A METAL ION LASER

BACKGROUND OF THE INVENTION

Our invention relates to lasers in general and, in particular, to a metal ion laser utilizing negative glow discharges in an atmosphere of an inert gas such as helium (He) for the vaporization of a metal such as cadmium (Cd) being heated. Still more particularly, our invention concerns an electric control system for such a laser designed for the production of a beam of stable intensity throughout the period of operation.

Metal ion lasers are capable of emitting multicolor beams by virtue of the intense excitations offered thereby. He-Cd ion lasers, for example, have so far been confirmed to emit as many as 12 different color beams including those of the primary colors. The metal ion lasers are definitely superior in this respect to liquid or solid lasers. There has, however, been a problem left unsolved with this type of laser. In a metal ion laser employing a hollow cathode, the required excitation for laser action is obtained by vaporizing cadmium or like metal and mixing the metal vapor with helium or like gas in the interior (cathode bore) of the hollow cathode. The production of an unfluctuating intensity beam by this type of laser depends in large measure in the constant metal vapor pressure in the cathode bore. As far as we are aware, there has heretofore been suggested no commercially acceptable laser equipped to automatically maintain the metal vapor pressure at a constant level.

SUMMARY OF THE INVENTION

We have hereby found out how to hold constant the metal vapor pressure in the excitation chamber of a metal ion laser.

Stated briefly, our invention provides an electric control system for a metal ion laser of the type having anode means open to the interior of a hollow cathode, metal chamber means also open to the interior of the hollow cathode and containing a metal material to be vaporized, and a heater for heating the metal chamber means in order to vaporize the metal material contained therein. The electric control system comprises constant current supply means connected to the anode means for supplying a constant current thereto, and heater control means connected between the constant current supply means and the heater for controlling the magnitude of a current fed to the heater so as to maintain the output voltage of the constant current supply means at a predetermined magnitude.

Our invention is based upon the fact that changes in the metal vapor pressure within the hollow cathode brings about corresponding changes in the impedance of the discharge between the anode means and the hollow cathode. Since the anode current is supplied from the constant current supply means, the changes in the discharge impedance manifest themselves as variations in the output voltage of the constant current supply means. Thus the heater control means controls the temperature of the metal chamber heater so as to hold constant the output voltage of the constant current supply means, thereby smoothing out the changes in the metal vapor pressure within the hollow cathode for the production of a constant intensity beam output.

The above and other features and advantages of our invention and the manner of realizing them will become more apparent, and the invention itself will best be understood, from a study of the following description and appended claims, with reference had to the attached drawings showing the preferred embodiments of the invention.

DESCRIPTION OF THE PREFERRED EMBODIMENTS

Figure 1:
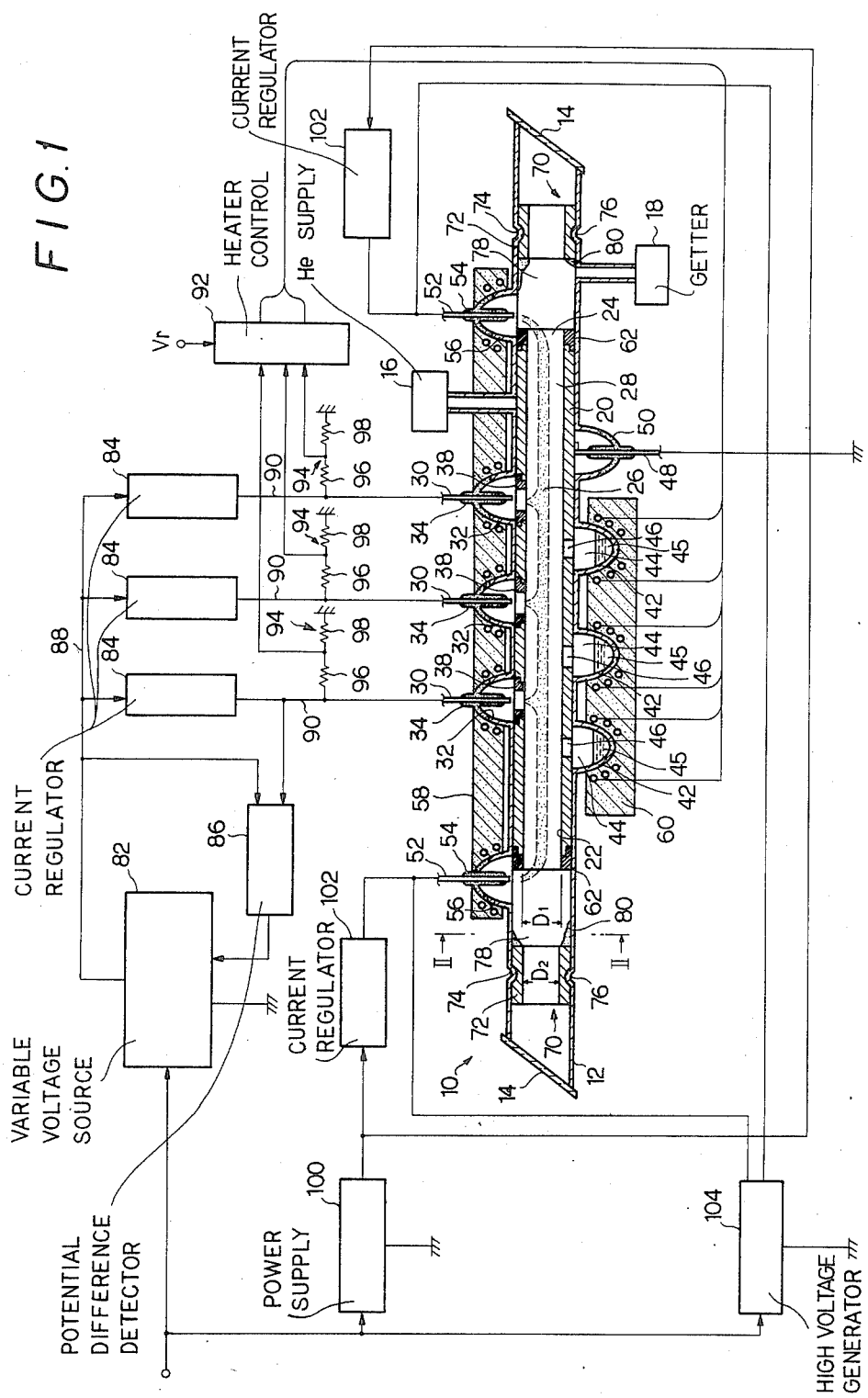
FIG. 1 is an axial section through a typical metal ion laser in accordance with our invention, shown together with a block diagrammatic representation of the electric control system for the laser.
Figure 2:
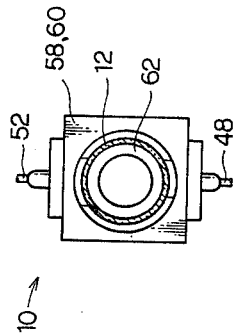
FIG. 2 is a cross section through the laser, taken along the line II—II of FIG. 1.

We will now describe our invention in detail as applied to the He-Cd ion laser of FIG. 1 and 2. Generally designated 10, the representative laser has a substantially tubular, elongate housing 12 having its opposite ends hermetically closed by a pair of Brewster windows 14. The sealed interior of the laser housing 12 communicates with a source 16 of He and is filled with this gas. The He source 16 is conventionally equipped to hold constant the gas pressure within the laser housing 12. This laser housing also communicates with a getter 18 for the removal of impurities from its interior.

Coaxially nested in the midportion of the laser housing 12 is a hollow cathode 20 having its opposite ends spaced a substantial distance from the Brewster windows 14. The hollow cathode 20 takes the form of a relatively thick walled tube of electroconductive material that will give as little spatter as possible during the operation of the laser 10. The hollow or bore 22 of this cathode provides a positive column discharge path 24, glow region 26 and cathode dark space 28, as is well known to the specialists.

A plurality of, three in the illustrated embodiment, primary anodes 30 are disposed in a row intermediate the opposite ends of the hollow cathode 20 and external thereto. Typically made of tungsten, molybdenum or like metal, each primary anode 30 is rigidly mounted to an anode mount 32 via a hermetic seal 34 of vitreous material. We have shown each anode mount 32 as a protuberant mouth of the laser housing 12, protruding radially outwardly therefrom. Each primary anode 30 extends radially of the laser housing 12 and is open to the cathode bore 22 via a respective stepped hole in the hollow cathode 20. Each stepped hole is lined by an annular insulator 38 of a ceramic or like material in order to protect the primary anodes 30 from the spattering of the hollow cathode 20 and against the consequent shorting of the primary anodes and the hollow cathode.

Preferably, each primary anode 30 has its extreme tip formed into a conical or frustoconical shape for more effective discharge and by way of protection against thermal impairment from such discharge. These tips of the primary anodes 30 are spaced a minimal distance from the circumference of the hollow cathode 20, inclusive of the annular insulator 38, in order that the hollow cathode may not ruin the primary anodes during its insertion in the laser housing 12.

The spacings between the three primary anodes 30 can be relatively small. For example, for a laser having an effective length of 300 millimeters (mm) and a cathode bore diameter D1 of 4 mm, the spacings can each be approximately 20 mm.

The laser housing 12 is formed to include another series of semielliptical protuberances 42 which are angularly displaced approximately 180 degrees from the anode mounts 32 and which are also disposed intermediate the opposite ends of the hollow cathode 20. These protuberances provide metal chambers 44 containing Cd or like metal material 45 to be vaporized. All the metal chambers 44 are open to the cathode bore 22 via a row of slots 46 defined axially of the hollow cathode 20. The metal chambers 44 have the same pitch distances as those of the primary anodes 30 and are offset therefrom in the longitudinal direction of the laser 10 by half the pitch distance.

Disposed adjacent the metal chambers 44 is a cathode 48 which is mounted to the laser housing 12 via a hermetic seal 50 of vitreous material in a manner similar to that in which the primary anodes 30 are mounted to the laser housing. The cathode 48 is coupled to the hollow cathode 20 in electrically conducting relation thereto on one hand and, on the other hand, is grounded.

A pair of secondary anodes 52 are disposed on both sides of the primary anodes 30, in the longitudinal direction of the laser 10, and adjacent the opposite ends of the hollow cathode 20. As has been known heretofore, the secondary anodes 52 are intended to protect the Brewster windows 14 from contamination by the vaporized Cd or like metal, as well as the cathode spatter, by sending it back into the hollow cathode 20. Just like the primary anodes 30, these secondary anodes 52 are each mounted via a vitreous hermetic seal 54 to a protuberant anode mount 56 formed in one piece with the laser housing 12.

Seen at 62 in FIG. 1 are a pair of tubular insulators of a ceramic or like material which are disposed respectively between the opposite ends of the hollow cathode 20 and the secondary anodes 52 and in coaxial relation to the hollow cathode. Thus the metal vapor is sent back by the secondary anodes 52 into the hollow cathode 20 through the tubular insulators 62.

The primary anodes 30, metal chambers 44 and secondary anodes 52 are conventionally furnished with ceramic heaters 58 and 60. FIG. 2 indicates that the ceramic bodies of these heaters 58 and 60 can be a unitary body encircling the laser housing 12.

The Brewster windows 14 is further protected against contamination by a pair of constriction means 70 disposed between the Brewster windows and the tubular insulators 62. The constriction means 70 are intended to reduce the diameter of the laser housing 12 at these points and hence to impeding the flows of the metal vapor toward the Brewster windows. Each constriction means 70 takes the form of a relatively short tube 72 of such material as a ceramic, a metal having a high heat dissipating capabiltiy, etc., which is coaxially mounted within the laser housing 12. The inside diameter D2 of each tube 72 is approximately equal to, or slightly less than, the diameter D1 of the cathode bore 22. In order to lock each tube 72 against axial displacement relative to the laser housing 12, an annular groove 74 may be defined circumferentially in the tube 72, and the laser housing may be constricted at 76, as by heating, into positive engagement in the groove 74 in the tube. The tubes 72 of the constriction means 70 are both spaced from the pair of tubular insulators 62 to provide therebetween relatively large diameter vapor chambers 78.

Although fractions of the Cd vapor and cathode spatter will traverse the constriction means 70, most of the particles will stay in the vapor chamber 78 and settle on the surfaces defining these chambers, as indicated at 80. Further, traveling through the constriction means 70, the noted fractions of the Cd vapor and cathode spatter will partly attach to the inside surfaces of the tubes 72. The remainders of the floating particles that have passed through the constriction means 70 will expand in volume and so will mostly deposit on the inside surface portions of the laser housing 12 rather than on the Brewster windows 14.

Such being the mechanical construction of the metal ion laser 10, we will now proceed to the description of the electric control system for this laser. The three primary anodes 30 are conneted to a variable voltage source 82 via respective constant current regulators 84. A potential difference detector 86 has two inputs connected to the input line 88 and output line 90, respectively, of one of the constant current regulators 84. The output of this potential difference detector is connected to the variable voltage source 82. Detecting the potential difference across the current regulators 84, the detector 86 delivers a corresponding voltage to the variable voltage source 82. The voltage source 82 is equipped to produce, in response to this input voltage, a variable output voltage necessary for holding the potential difference across each current regulator 84 at a constant value of, say, 50 volts.

The output lines 90 of all the current regulators 84 are further connected to a heater control circuit 92 via respective voltage dividers 94. We have shown each voltage divider 94 as a series connection of two resistors 96 and 98, with the junction therebetween connected to the heater control circuit 92. Each resistor 96 is connected to the associated output line 90, and each resistor 98 is grounded.

Connected to the metal chamber heater 60, the heater control circuit 92 functions to control the evaporation of the Cd material in the metal chambers 44 in accordance with our invention. To this end the heater control circuit 92 so regulates the current fed to the metal chamber heater 60 that the average of the prescribed fractions of the output voltages of the current regulators 84 may equal a reference voltage Vr. This reference voltage is defined as:

$$Vr = R1/(R1+R2) \cdot Va$$

wherein:
R1 = the resistance of each resistor 98,
R2 = the resistance of each resistor 96, and
Va = the optimum anode voltage for laser action.

The other heater 58 is for heating the primary anodes 30 and secondary anodes 52 to a temperature sufficient to prevent the deposition of the vaporized metal on these anodes and on their neighborhoods. The anode heater 58 is fed from a separate power supply which is not shown because of its conventional nature.

The electric control system further includes another power supply 100 connected to the pair of secondary anodes 52 via a respective constant current regulator 102. The secondary anodes 52 are further connected directly to a common high voltage generator 104.

Operation

As is well known, in this type of metal ion laser, a negative glow discharge takes place between primary anodes 30 and hollow cathode 20 upon impression of a required voltage therebetween. The negative glow discharge results in the vaporization of the Cd contained in the metal chambers 44, the latter being heated by the heater 60. The Cd vapor is excited to higher energy levels by excitation particles such as He ions. Being thick walled as aforesaid, the hollow cathode 20 has sufficient heat conductivity and capacity to afford a uniform temperature distribution of the glow region 26, preventing a transition to arc discharge through abnormal glow discharge.

Immediately after the commencement of the discharge, and before the Cd vapor flows into the cathode bore 22, the primary anodes 30 has a voltage ranging from 260 to 270 volts (depending upon the anode construction and the gas pressure within the laser housing 12) with respect to the ground if the discharge current of each anode is 50 milliamperes. Thus, in response to the output voltage of the potential difference detector 86, the variable voltage source 82 puts out a voltage of 310 to 320 volts, 50 volts higher than the anode voltage.

The actual oscillation of the laser 10 begins as the Cd vapor fills the cathode bore 22 upon lapse of several minutes following the commencement of the discharge. Then the anode voltage will rise to a range of 350 to 360 volts, so that the variable voltage source 52 will put out a voltage ranging from 400 to 410 volts. As the output voltage of the variable voltage source 82 is automatically varied as above, the power consumption (the losses due to the current regulators 84) is reduced to a minimum during the initial period of laser action. The efficiency of the variable voltage source 82 is to remain nearly constant despite changes in its output voltage.

After the laser 10 has started oscillation, the Cd vapor pressure in the cathode bore 22 has heretofore fluctuated to such an extent as to significantly affect the intensity of the beam output. Such fluctuations of the Cd vapor pressure manifest themselves as the variations of the discharge impedances. Since the anode current is supplied through the current regulators 84 in accordance with our invention, these variations of the discharge impedances result in corresponding changes in the output voltages of the current regulators and, consequently, in corresponding changes in the input voltages of the heater control circuit 92 as the latter inputs the prescribed fractions of the current regulator output voltages. The heater control circuit 92 controls the magnitude of the current fed to the metal chamber heater 60 so as to hold constant the output voltages of the current regulators 84, thereby optimizing the Cd vapor pressure in the cathode bore 22 for the production of a laser beam of unvarying intensity.

Alternate Form

Figure 3:
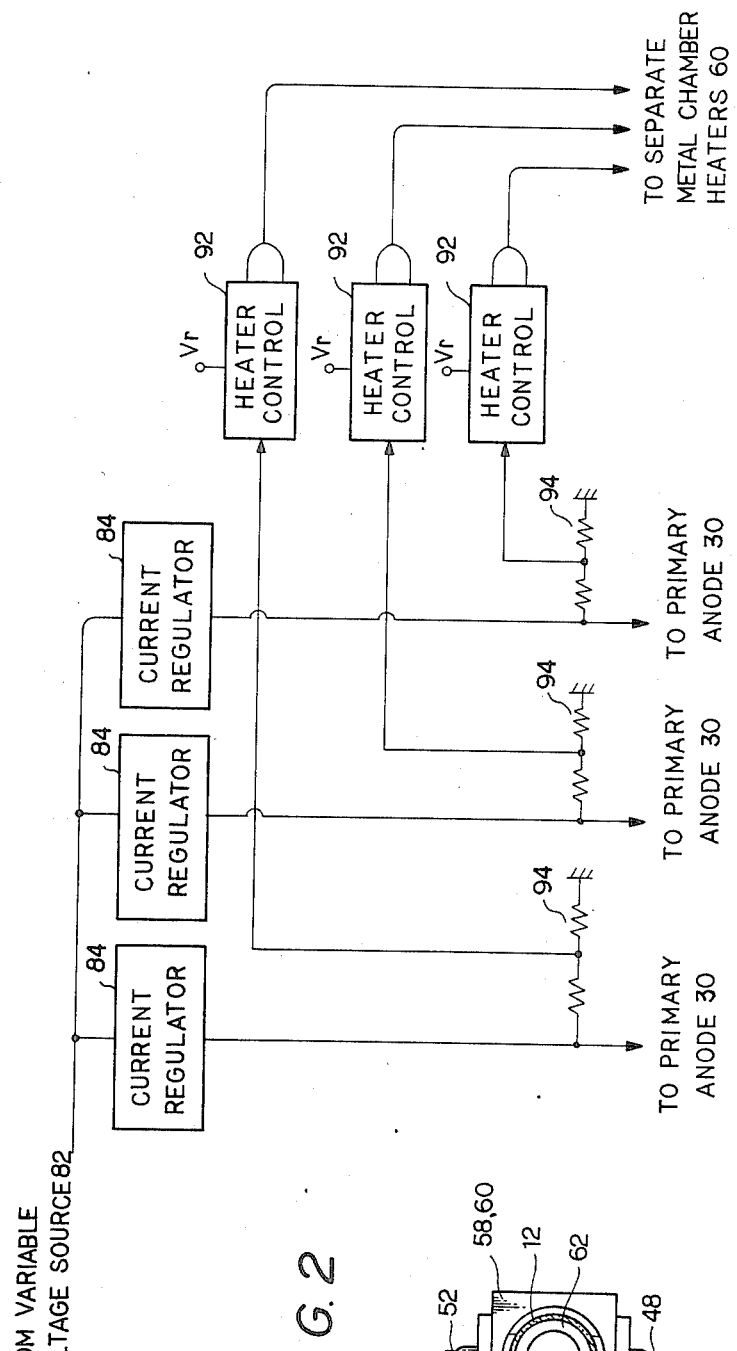
FIG. 3 is a block diagram showing part of another preferable form of the electric control system in accordance with out invention, which is also applicable to the metal ion laser of FIG. 1.

The foregoing embodiment has but one heater control circuit 92 which responds to the average of the output voltages of the constant current regulators 84 for jointly controlling the temperatures of all the metal chambers 44. FIG. 3 shows an alternate embodiment of our invention which has three heater control circuits 92 for individually controlling the three heaters (or three separate sections of one heater 60) provided for the respective metal chambers 44. Each heater control circuit 92 has its input connected to one of the current regulators 84 via one of the voltage dividers 94. This alternate control system can be analogous in the other details of construction with that of FIG. 1. The construction of the metal ion laser to be controlled thereby can also be as illustrated in FIGS. 1 and 2.

Each heater control circuit 92 controls the magnitude of a current fed to one associated metal chamber heater 60 so as to hold the output voltage of one associated current regulator 84 equal to a reference voltage Vr. It is therefore apparent that the distribution of the vapor pressure can be held constant in the longitudinal direction of the hollow cathode 20.

It is to be understood that we have shown and described the foregoing preferable embodiment merely to illustate or explain and not to impose limitations upon our invention. Various modifications or changes of the illustrated embodiments will occur to the specialists without departing from the scope of our invention.

We claim:

1. An electric control system for a metal ion laser of the type having anode means open to the interior of a hollow cathode, metal chamber means also open to the interior of the hollow cathode and containing a metal material to be vaporized, and a heater for heating the metal chamber means in order to vaporize the metal material contained therein, the electric control system comprising constant current supply means connected to supply an output voltage thereof to the anode means for supplying a constant current thereto, and heater control means, connected between the constant current supply means and the heater, for controlling the magnitude of a current fed to the heater so as to maintain at a predetermined magnitude an output voltage of the constant current supply means to thereby stabilize the laser output.

2. An electric control system for a metal ion laser of the type having a plurality of anodes open to the interior of a hollow cathode, metal chamber means also open to the interior of the hollow cathode and containing a metal material to be vaporized, and a heater for heating the metal chamber means in order to vaporize the metal material contained therein, the electric control system comprising a plurality of constant current regulators connected one to each anode for supplying a constant current thereto, and a heater control circuit, connected between the constant current regulators and the heater, for comparing the output voltages of the constant current regulators with a predetermined reference voltage and for controlling the magnitude of a current fed to the heater so as to hold equal to said reference voltage respective output voltages of the constant current regulators to thereby stabilize the laser output.

3. The electric control system as recited in claim 2, further comprising a plurality of voltage dividers connected one between each constant current regulator and the heater control circuit for supplying a predetermined fraction of the output voltage of each constant current regulator to the heater control circuit.

4. The electric control system as recited in claim 2, further comprising a variable voltage source connected to the constant current regulators for powering the same, and a potential difference detector for detecting a potential difference across each constant current regulator and for delivering to the variable voltage source a voltage proportionate to the detected potential difference, the variable voltage source responding to the input voltage by varying its output voltage so as to hold the potential difference across each constant current regulator at a predetermined magnitude.

5. An electric control system for a metal ion laser of the type having a plurality of anodes open to the interior of a hollow cathode, a plurality of metal chamber means associated one with each anode and also open to the interior of the hollow cathode, the metal chamber means containing a metal material to be vaporized, and a plurality of heaters for heating the respective metal chamber means in order to vaporrize the metal material contained therein, the electric control system comprising a plurality of constant current regulators connected one to each anode for supplying a constant current thereto, and a plurality of heater control circuits connected one between each constant current regulator and the associated one of the heaters, each heater control circuit comparing the output voltage of one constant current regulator with a predetermined reference voltage, for controlling the magnitude of a current fed to the respective heater associated therewith, so as to hold the output voltage of the constant current regulator equal to the reference voltage to thereby stabilize the laser output.

* * * * *